Figure 1:
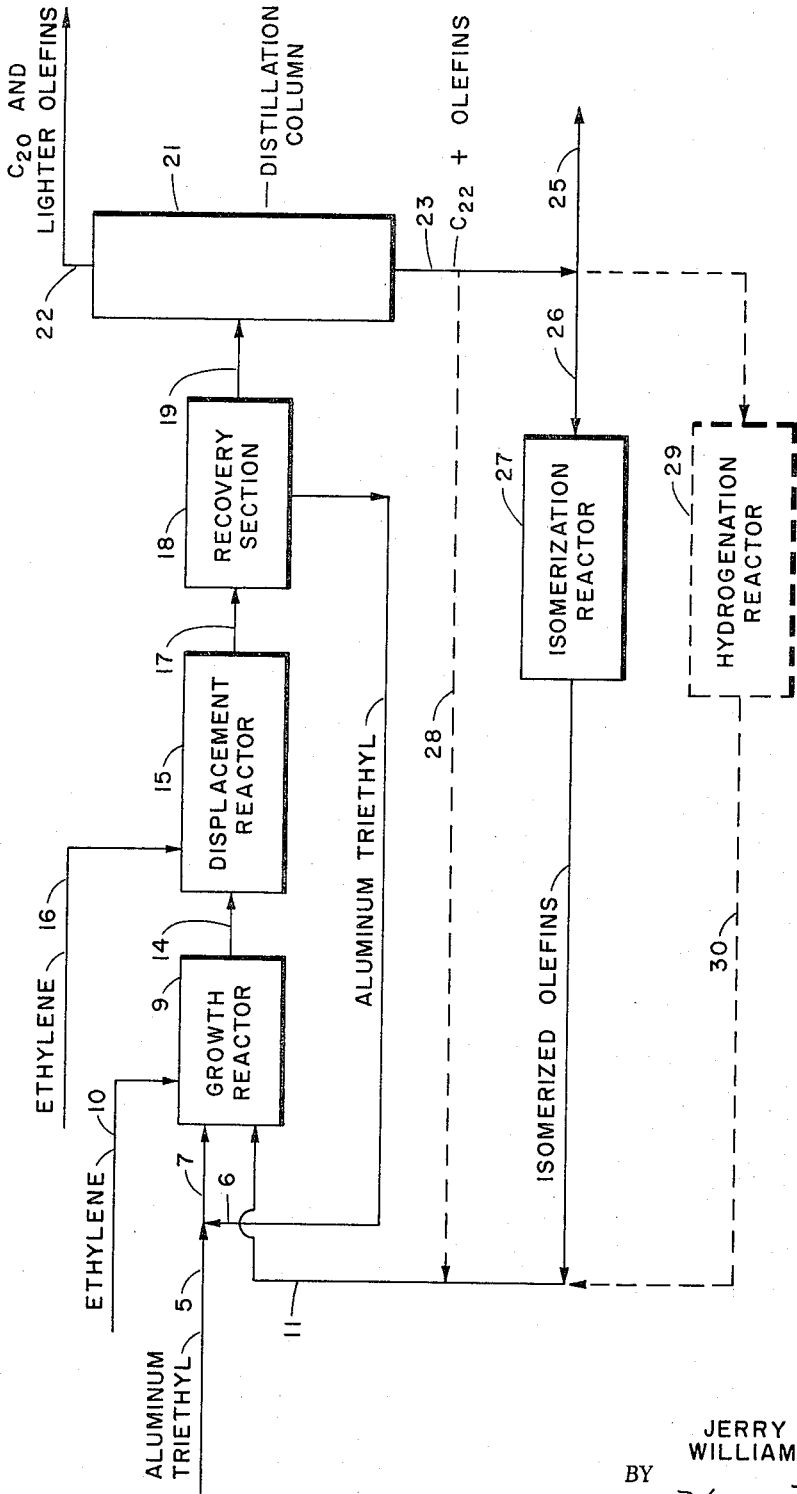

INVENTORS.
JERRY A. ACCIARRI
WILLIAM B. CARTER
BY
Henry N. Huth
ATTORNEY

INVENTORS.
JERRY A. ACCIARRI
WILLIAM B. CARTER
BY
ATTORNEY

United States Patent Office 3,358,050
Patented Dec. 12, 1967

3,358,050
PRODUCTION OF ALPHA-OLEFINS
Jerry A. Acciarri and William B. Carter, Ponca City, Okla., assignors to Continental Oil Company, Ponca City, Okla., a corporation of Delaware
Filed Oct. 15, 1962, Ser. No. 230,526
14 Claims. (Cl. 260—683.15)

This invention relates to an improved process for the production of alpha-olefins by the growth reaction involving a low molecular weight aluminum trialkyl and a low molecular weight alkylene.

In the process of producing high molecular weight alpha-olefins from the growth reaction, the high molecular weight trialkyl which is obtained by reacting a low molecular weight trialkyl with a low molecular weight alkylene is subjected to a displacement reaction with a low molecular weight alkylene. In the displacement reaction, it is important to maintain a liquid phase; otherwise the aluminum alkyls tend to decompose at the elevated temperature of the displacement reaction. The liquid phase is maintained by the use of a diluent or solvent; and for this purpose it has been suggested using a saturated aliphatic hydrocarbon or a narrow boiling range mixture of such hydrocarbons, which can subsequently be separated from the displaced olefins by distillation. The saturated hydrocarbons are satisfactory from the standpoint of preventing the decomposition of the aluminum alkyls but are costly to use by virtue of losses which are inevitably encountered in the process. For that reason, efforts have been made to determine a better way of effecting the displacement reaction.

Accordingly, one object of the present invention is to utilize a hydrocarbon fraction derived from the process of preparing alpha-olefins in the displacement reaction.

Another object of the invention is to provide a combination process in which the diluent required for the displacement reaction is generated within the process itself.

Other objects and advantages of this invention will become apparent from the following description and explanation thereof.

In accordance with the present invention, a low molecular weight aluminum alkyl is reacted with a low molecular weight alkylene to produce a growth product including high molecular weight aluminum alkyls. The aluminum alkyls are subjected to a displacement reaction in the presence of a hydrocarbon fraction which boils above the decomposition temperature of the aluminum alkyls and is produced in the manner to be described hereinafter. The displacement reaction involves the replacement of the alkyl radicals of the high molecular weight alkyls with a low molecular weight alkylene. The displaced alkyl radicals become alpha-olefins, and the aluminum compounds resulting from the reaction product are of relatively low molecular weight. The displacement reaction product is then subjected to a separation treatment for the removal of the low molecular weight aluminum alkyls. The remaining hydrocarbon material is subjected to a further separation treatment to provide a high boiling fraction, including the diluent employed in the displacement reaction and alpha-olefins. The separated high boiling fraction as such may be used as a diluent; or it can be subjected to isomerization or hydrogenation, whereby the double bond in the olefin is shifted from the alpha position in the former case or is eliminated entirely by the latter treatment. The treated or untreated high boiling fraction is reused in the displacement reaction.

The growth reaction involves the reaction between a low molecular weight mono-olefin or alkylene, such as ethylene, propylene, butene, etc., with a low molecular weight aluminum trialkyl, such as, for example, an aluminum trialkyl having the alkyl substituents containing from about 2 to 4 carbon atoms. The resultant growth product comprises a trialkyl compound in which the alkyl groups vary widely in molecular weight. The growth reaction can be illustrated by the following equation:

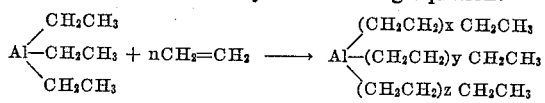

wherein $x$, $y$, $z$ represent integers ranging from 0 to about 14 and $x+y+z$ is equal to small "$n$." The growth reaction can be carried out by passing the mono-olefin such as ethylene through trialkylaluminum such as triethylaluminum, preferably in the presence of a diluent under a variety of reaction conditions. The temperature of reaction can be from about 65° to 150° C. and at a pressure of about 200 to 5000 p.s.i.g., and more usually a temperature of about 90° to 120° C. and at a pressure of about 1000 to 3500 p.s.i.g.

The growth reaction provides a statistical distribution of alkyl chain lengths characterized by the Poisson relationship, which can be expressed as follows:

$$P_{(n)} = \frac{m^n e^{-m}}{n!}$$

wherein $P_{(n)}$ represents the probability that a certain hydrocarbon radical will be formed by $n$ additions of ethylene to the aluminum ethyl bond originally present and $m$ is the mean number of additions of ethylene per growing chain. The following table contains an illustration of a type of distribution which is obtained in the growth reaction:

TABLE

| Alkyl group: | Wt. percent |
|---|---|
| $C_2$ | 0.04 |
| $C_4$ | 0.23 |
| $C_6$ | 3.37 |
| $C_8$ | 11.79 |
| $C_{10}$ | 20.42 |
| $C_{12}$ | 22.63 |
| $C_{14}$ | 18.20 |
| $C_{16}$ | 11.61 |
| $C_{18}$ | 6.21 |
| $C_{20}$ | 3.47 |
| $C_{22}$ | 1.25 |
| $C_{24}$ | 0.49 |
| $C_{26}$ | 0.18 |
| $C_{28}$ | 0.05 |

The growth reaction may be carried out in a diluent which can be paraffin, cycloparaffin or aromatic hydrocarbon such as for example, isooctane, cyclohexane, benzene, xylene, and the like. The diluent aids in controlling the temperature of the reaction which is exothermic and also serves as a solvent for the growth product. The diluent employed in the growth reaction can also be the treated or untreated olefin which was described hereinabove. The description of the treated or untreated olefin will be given in greater detail hereinbelow.

The growth product has alkyl substituents containing about 2 to 40 carbon atoms or higher. It is subjected to a displacement reaction with a low molecular weight mono-olefin containing about 2 to 4 carbon atoms. The low molecular mono-olefins may be, for example, ethylene, propylene or butene. In the displacement reaction the mono-olefin is substituted for the high molecular weight alkyl substituents of the aluminum compound. As a consequence, the displacement reaction product comprises a low molecular weight trialkyl in which the alkyl substituents contain about 2 to 4 carbon atoms and alpha-olefins containing about 2 to 40 carbon atoms or higher.

The displacement reaction can be effected in the absence of catalyst by the atomization technique. In such method, the feed is atomized through well-known means as it is introduced into the displacement reaction zone. The temperature is maintained below about 700° F., more usually between about 100° and about 700° F., preferably between about 400° and about 550° F. The reaction pressure is maintained below about 200 p.s.i.a. and can be in the subatmospheric range, for example, as low as 1 p.s.i.a. Preferably, the pressure of the reaction varies between about 20 and about 100 p.s.i.a. The time of the reaction may be from about 30 seconds to about 15 minutes, more usually about 1 minute to about 10 minutes, and preferably from about 3 minutes to about 7 minutes.

With regard to the means of spraying the aluminum alkyls, various techniques can be employed. For example, the conventional hollow cone nozzles can be employed and atomization is obtained by maintaining a pressure differential across the nozzle. In some instances, the atomization of aluminum alkyl is aided by the use of an atomizing gas, which for the purpose of the present invention can be the alkylene, which is employed in the displacement reaction. Introducing the aluminum alkyls at an elevated temperature is desirable because of the reduction in viscosity. In general the aluminum alkyls are preheated to a temperature below the reaction temperature, for example, up to about 650° F. Prior to atomization, preheating of the aluminum alkyls is preferably carried out to provide a temperature of about 190° to 320° F.

In a noncatalytic operation where the feed to the displacement reaction is not atomized, it is preferred to employ a temperature of about 392° to 608° F. for the displacement reaction. The displacement reaction would then preferably be conducted at a pressure of about 30 to 150 p.s.i.g., and the time of reaction could vary from about 0.1 to 10 seconds.

The displacement reaction can also be effected in the presence of a catalyst. For this purpose, it is preferred that the temperature of reaction vary from about 50° to 150° C. and at a pressure of about 300 to 1500 p.s.i.g. The time of reaction may be from about 1 to 30 minutes. A suitable catalyst for use in the reaction may include any of the so called reduction catalysts such as nickel, cobalt, palladium and iron compounds. The preferred catalyst is a nickel compound which will react with the aluminum trialkyl compound. Specific nickel catalysts include finely divided metallic nickel, Raney nickel, nickel acetylacetonate, nickel naphthenate, etc. The amount of catalyst employed in the reaction can be varied greatly however, usually about 0.001 to 0.1%, based on the weight of the growth product, are employed.

In the displacement reaction the quantity of low molecular weight mono-olefin or alkylene employed is governed to affect complete replacement of the alkyl substituents in the high molecular weight aluminum alkyl. Accordingly a stoichiometric amount of the low molecular weight mono-olefin can be used, however, it is preferred to employ a stoichiometric excess of about 200 to 1000 mole percent of the low molecular weight mono-olefin per mole of growth product for thermal displacement and about 10 to 100 mole percent for catalytic displacement.

It is also contemplated that a portion of the growth product may be utilized for the production of alcohols. For that purpose, the growth product is oxidized to produce aluminum olkoxides which are then subsequently hydrolyzed to the alcohols. Any alpha-olefins contained in the growth product can be removed by stripping prior to the oxidation step. The oxidation of the aluminum compounds may be accomplished with an oxygen containing gas, for example, air, oxygen, etc. The oxidation reaction may take place, with or without a solvent, however, a solvent facilitates the reaction significantly. The solvent to be employed may be any one or more of the inert hydrocarbons specified hereinabove in connection with the growth reaction or the displacement treatment. Unless, for economical reasons it is advisable to use the same solvent in the oxidation treatment as was used for the growth reaction or the displacement treatment, it is preferred to use a kerosene fraction having an ASTM initial boiling point of about 350° to 400° F. and an ASTM end point of about 500° to 520° F. The oxidation of aluminum compound with the oxygen containing gas can take place at a temperature of about 50° to 140° F., more usually about 70° to 120° F. For the reaction, the pressure may be about 10 to 60 p.s.i.g., more usually about 40 p.s.i.g. It is to be understood that the conditions of temperature, pressure and quality of oxygen containing gas employed may be varied considerably and still be useful for the purposes of this invention. The quantity of oxygen containing gas employed in the oxidation treatment is measured on an oxygen basis and at a pressure of 760 mm. Hg and 32° F. On such a basis, the quantity of oxygen employed in the reaction may be about 440 to 530 standard cubic feet per pound mole of aluminum trialkyl, more usually about 460 to 500 cubic feet per pound mole of aluminum trialkyl.

Following the oxidation treatment, the oxidation product may be hydrolyzed to produce alcohols. For the hydrolytic reaction, the hydrolyzing agent may be, for example, a mineral acid e.g. sulfuric acid, etc. A basic material such as, for example, sodium hydroxide, potassium hydroxide, and the like may also be used as the hydrolyzing agent. Hydrolysis can also be achieved through the use of water or steam, however dilute sulfuric acid is preferred as the hydrolyzing agent. The dilute sulfuric acid may contain about 20 to 30% by weight sulfuric acid, more usually about 24 to 26% by weight of the same. The oxidation product or the trialkoxides are treated with about 100 to 120% by weight of dilute sulfuric acid, more usually about 103 to 110%, based on the weight of the aluminum compounds. The hydrolytic reaction is conducted at a temperature of about 160° to 212° F., more usually about 175° to 190° F. The pressure of the reaction may be about 0 to 100 p.s.i.g., more usually about 0 to 10 p.s.i.g. The reaction period may vary considerably, depending upon the extent of conversion of alkoxide groups to alcohol molecules which is desired. Generally, the reaction may be about 0.25 to 2 hours, more usually about 0.25 to 0.3 hour.

Following the displacement reaction, the reaction product is subjected to a separation treatment for the recovery of alpha-olefins. The type of alpha-olefins present in the reaction product is determined by the Poisson number. Within the $m$ value ordinarily obtained, namely about 3.5 to 4.5 in the practice of this invention, it will be found that 3 to 5% alpha-olefins containing at least 18 carbon atoms will be produced. The fraction of alpha-olefins containing at least 18 carbon atoms per molecule can be employed as the solvent or diluent in the displacement reaction. For commercial reasons it may be desirable to employ a fraction in which the alpha-olefins contain at least 20 carbon atoms per molecule or even at least 22 carbon atoms per molecule. The type of alpha-olefin in the fraction to be employed as a solvent material will depend upon the economics of the situation. The upper limit as to the number of carbon atoms in the alpha-olefin will also vary depending upon the $m$ value, however it is contemplated going as high as 40 or more carbon atoms. Generally, the fraction may contain alpha-olefins having about 18 to 40 carbon atoms, more usually about 20 to 40 carbon atoms and preferably about 22 to 30 carbon atoms. The alpha-olefins which are produced in the process may be used as the solvent or diluent without further treatment.

Due to the tendency of the alpha-olefins to be slightly reactive, it is also contemplated that they be isomerized so that the double bond is shifted from the alpha position to a more internal position in the molecule. For this purpose the fraction of alpha-olefins is treated with an alumina containing catalyst under isomerization conditions. The alumina containing material may be alumina, silica-alumina, etc. The alumina material may be alumina gel, activated alumina, bauxite, etc. The silica-alumina may be synthetic or natural occurring such as for example, acid treated bentonite clay, silica-alumina gel, etc. The silica-alumina catalyst may contain from about 0.5 to 30% by weight of silica. The isomerization reaction may be conducted at a temperature of about 600° to 900° F., more usually about 700° to 850° F., and at a pressure of about 0 to 100 p.s.i.g., more usually about 0 to 10 p.s.i.g. The operation may be conducted as a fixed or moving bed, using weight space velocities of 100 to 1000°, measured as the pounds of feed material fed to the reaction zone on an hourly basis per pound of catalyst which is present therein. More usually the weight space velocities may vary from about 500 to 5000.

Alternatively, the alpha-olefins may be hydrogenated to produce saturated compounds. For this purpose, the alpha-olefins are treated with a hydrogen containing gas, e.g. hydrogen, etc. in the presence of a hydrogenation catalyst. Any suitable hydrogenation catalyst may be used for this purpose, such as for example, nickel, chromium oxide, molybdenum oxide, chromium sulfide, molybdenum sulfide, cobalt oxide, cobalt molybdate, nickel tungstate, etc. The hydrogenation treatment may be conducted as a fixed or moving bed operation, using pelleted, granular or finely divided catalytic material. The hydrogen feed to the reaction zone may be from about 250 to 10,000 standard cubic feet of hydrogen (measured at 32° F. and 760 mm. Hg) per hour. The weight space velocity may range from about 0.05 to 10, measured as the pounds of alpha-olefin charged to the reaction zone per hour per pound of catalyst which is present therein. The hydrogenation treatment is conducted at a temperature of about 500° to 950° F., and at a pressure of about 100 to 1000 p.s.i.g.

The alpha-olefin with or without treatment boils in a range of temperatures which renders it easy to separate from the other products of the process. The treated or untreated alpha-olefin is used in the displacement reaction in an amount of about 10 to 50 parts by volume per unit weight of aluminum alkyls, more usually about 20 to 30 per unit weight. The same amount may be used in the growth reaction, if desired. After the treated or untreated alpha-olefin is used as a solvent in the process, it is recovered as part of the product fraction containing the newly produced alpha-olefin. Some of the treated or untreated alpha-olefin is lost and thus is replaced by newly produced alpha-olefin material. Any alpha-olefins which are produced in excess of what is needed in the process are yielded as a net product before being treated as described hereinabove.

The effectiveness of using a nickel catalyst for the isomerization of high molecular weight alpha-olefins was established by a preliminary run as shown in Example I below.

*Example I*

The bottom product of a fractionated thermally displaced product was employed as the feed material. The bottom product contained about 85% of alpha-olefins, the boiling alpha-olefin containing about 18 carbon atoms and the highest boiling alpha-olefin containing about 40 carbon atoms. The remainder of the bottom product was internal olefins, branched olefins and paraffins.

100 ml. of the thermally displaced bottom product described above were treated with a mixture of nickel naphthenate activated with 2 volume percent of aluminum triethyl to provide 25 p.p.m. nickel. The treatment was conducted at 140° C. for about 1 hour. At the end of this time, nearly all the alpha-olefins were isomerized to olefins containing the double bond in a more internal position.

To provide a fuller understanding of the present invention reference will be had to the accompanying drawing which forms a part of this specification.

In FIGURE 1 fresh aluminum triethyl is supplied from a source 5 at the rate of 5 pounds per hour. The fresh aluminum triethyl is mixed with recycled aluminum triethyl, which is fed from line 6 at the rate of 95 pounds per hour, and the combined streams flow in line 7 before entering the growth reactor 9. Ethylene is supplied to the reactor 9 by means of line 10 at the rate of 110 pounds per hour. An isomerized fraction which is to serve as solvent, is fed to the growth reactor 9 by means of line 11 at the rate of 100 pounds per hour. In the growth reactor the temperature is maintained at 245° F. and at a pressure of 1500 p.s.i.g. The reaction mixture has a residence time of 3 hours, thus resulting in $m$ value of 4 for the growth product.

The growth product leaves the growth reactor by means of line 14 and is fed into a thermal displacement reactor 15. Ethylene is fed to the thermal displacement reactor from a source 16 at the rate of 81 pounds per hour. In the catalytic displacement reactor the temperature is maintained at 230° F. and the pressure is 450 p.s.i.g. The reaction mixture has a resident time of 3 minutes. As a result of the conditions existing in the reactor 15, all of the alkyl radicals in the aluminum alkyls of the growth product are replaced with ethylene groups through the reaction with ethylene. The displacement product leaves the reactor 15 by means of a line 17, and thence it enters a recovery section 18 in which the aluminum triethyl is recovered. The separation treatment for recovery of the aluminum triethyl is described in greater detail in connection with FIGURE 2, and is incorporated herein by reference. It will be noted that the isomerized fraction which is used as a solvent in the system has a higher boiling point than the aluminum triethyl in order for this type of separation to be possible. The recovered aluminum triethyl is recycled to the growth reactor by means of line 6. The remaining material leaves the separation section 18 by means of line 19 and enters a distillation column 21. In the distillation column, the olefins containing not more than 20 carbon atoms are yielded as an overhead fraction through line 22. The olefins containing at least 22 carbon atoms and the isomerized fraction leave the distillation column 21 through a bottom line 23. In the distillation column, the top temperature is maintained at 450° F. whereas the bottom temperature is maintained at 550° F.

A portion of the alpha-olefins containing at least 22 carbon atoms are yielded from the system through a line 25, whereas the remaining portion is fed to an isomerization reactor 27 by means of line 26. The isomerization reactor contains granular bauxite. The fraction containing alpha-olefins of at least 22 carbon atoms is fed to the isomerization reactor 26 at a rate of 10 pounds per hour, thus providing a weight space velocity of about 100. The temperature of isomerization is 250° F. and the pressure is 0 p.s.i.g. The isomerized product leaves the reactor 26 by means of line 11 and is recycled to the growth reactor.

Two additional and alternative embodiments of the invention are illustrated in FIGURE 1. In one embodiment, the high molecular weight olefin fraction obtained from distillation column 21 is employed as displacement diluent without additional treatment, the olefins being recycled to the reactor through dashed line 28.

In another embodiment of the invention, the high molecular weight olefins obtained from distillation column 21 are passed through line 23 to hydrogenation reactor 29 wherein the olefins are hydrogenated with nickel naphthenate catalyst at a temperature of 140° C. for about one hour. The hydrogenation product is then passed through dashed line 30 to the growth reactor.

When a portion of the growth product is to be used for the production of alcohols, it is preferred that the system be operated to utilize the isomerized fraction only for the thermal displacement reaction. The solvent used in the growth reaction may be a saturated aliphatic hydrocarbon, such as for example, kerosene, so that it can also be utilized in the oxidation step wherein the aluminum alkyls are converted to aluminum alkoxides. This system is illustrated in FIGURE 2.

Figure 2:
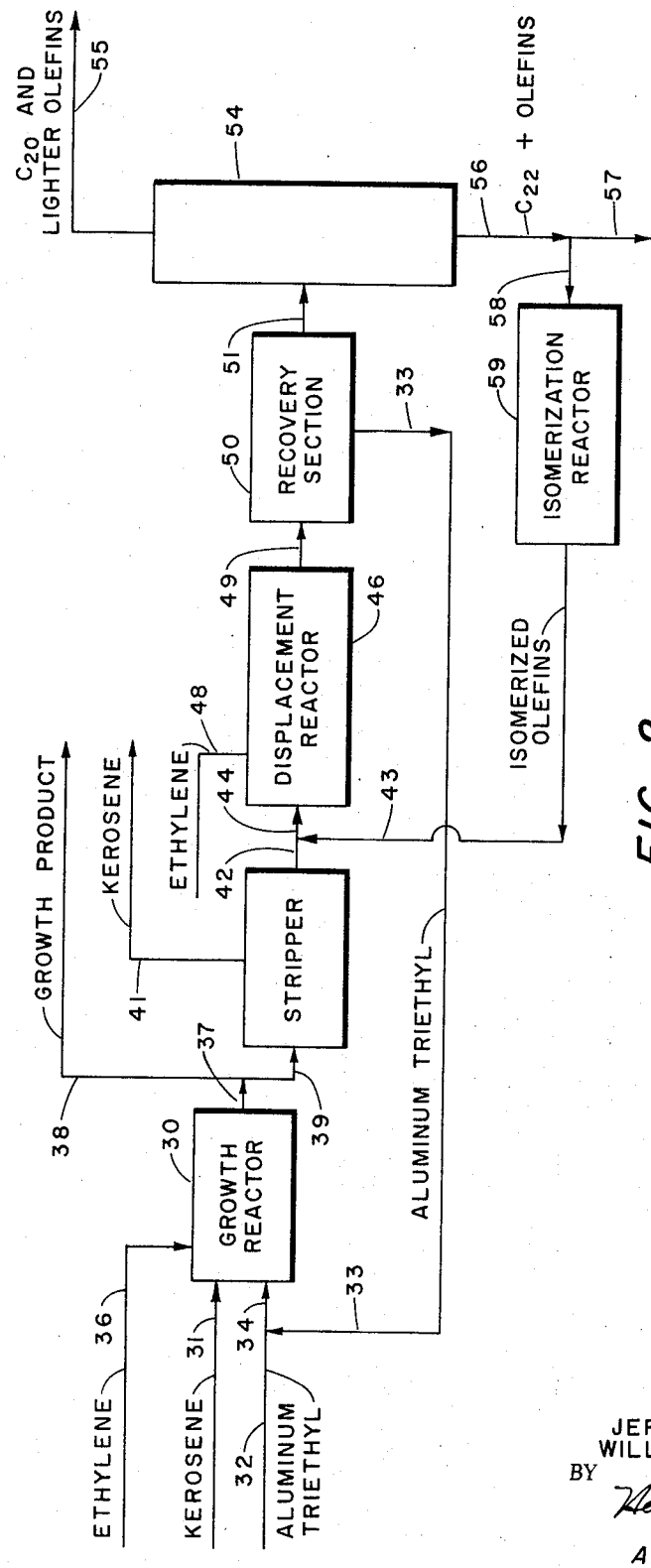

In FIGURE 2, kerosene having an ASTM initial boiling point of 300° F. and an end point of 425° F. is fed to the growth reactor 30 by means of supply line 31 at the rate of 100 pounds per hour. Make-up aluminum triethyl is supplied from a source 32 at the rate of 5 pounds per hour. A recycled stream of aluminum triethyl flows through a line 33 at the rate of 95 pounds per hour. The make-up and recycle streams of aluminum triethyl are combined in a line 34 prior to entering the growth reactor 30. Ethylene is charged to the growth reactor 30 by means of line 36 at the rate of 110 pounds per hour for 3 hours. In the growth reactor the temperature is maintained at 245° F. and at a pressure of about 1500 p.s.i.g.

The growth product leaves the growth reactor 30 through line 37. A portion of the growth product in line 37 is passed through line 38 which leads to an oxidation reactor not shown in the drawing. The remaining portion of the growth product is passed through line 39 at the rate of 100 pounds per hour before entering the stripper 40. In the stripper, the temperature is maintained at 320° F. and at a pressure of 3 mm. Hg making possible the removal of the kerosene solvent as an overhead fraction. If desired a normally gaseous hydrocarbon material may be used as a stripping gas in the stripping operation. The kerosene solvent is yielded from the stripper 40 by means of line 41, whereas the stripped growth product is discharged from the stripper by means of line 42. The stripped growth product is combined with an isomerized fraction flowing through line 43 at the rate of 25 pounds per hour. The isomerized fraction serving as a solvent and the stripped growth product are joined in line 44 prior to entering a thermal displacement reactor 46.

The thermal displacement reaction takes place in the presence of the isomerized alpha-olefins rather than the kerosene solvent. Ordinarily kerosene has too wide a boiling range to be separated from the olefins formed in the displacement reaction. Ethylene is charged to thermal displacement reactor 46 by means of line 48 at the rate of 16 pounds per hour. In the reactor 46, the temperature is maintained at 230° F. and the pressure at 450 p.s.i.g. The reaction takes place for a period of about 3 minutes, which is sufficient to cause complete displacement of the alkyl radicals in the aluminum alkyls by means of ethylene. The displacement product leaves the reactor 46 by means of line 49, and thence it enters a recovery section 50 wherein aluminum triethyl is separated.

The recovery section consists of two distillation columns in series, the first involves the separation of alpha-olefins into two fractions, one contains alpha-olefins of ten or less carbon atoms and the other contains a portion of the C$_{10}$ olefin with higher boiling alpha-olefins and aluminum triethyl. In the second distillation column, an overhead fraction consists of part of the C$_{12}$ alpha-olefins and aluminum triethyl, whereas the bottom fraction contain alpha-olefins heavier than C$_{14}$. In the first distillation column, the top temperature is 215° F. and the bottom temperature is 230° F. In the second distillation column, which is maintained under vacuum, the top temperature is 230° F. and the bottom temperature is 550° F. The stream containing alpha-olefins heavier than C$_{12}$ is yielded from the recovery section 50 by means of line 51. The fraction containing part of the C$_{12}$ alpha-olefins and aluminum triethyl is discharged from the recovery section 50 by means of line 33 and then is recycled to the growth reactor.

The alpha-olefin fraction in line 51 is charged to the distillation column 54. The distillation column 54 yields an overhead fraction of olefins containing not more than 20 carbon atoms by means of line 55. The heavier olefins are yielded from the bottom of the distillation column through line 56. Part of the heavier olefins are discharged from the system at the rate of 2 pounds per hour through line 57, and the remainder flows through line 58 and enters an isomerization reactor 59. The conditions of operation in distillation column 54 and the isomerization reactor 59 are essentially the same as described in connection with distillation column 21 and isomerization 26 of FIGURE 1. The isomerized olefins are yielded from the reactor 59 by means of line 43, and then they are recycled to the thermal displacement reactor 46.

Having thus described the invention by providing specific examples thereof, it is to be understood that no undue limitations or restrictions are to be drawn by reason thereof and that many variations and modifications are within the scope of the invention.

What is claimed is:
1. A process which comprises
   (a) reacting a low molecular weight aluminum trialkyl with ethylene in the presence of a hydrocarbon diluent hereinafter defined to produce a growth product,
   (b) reacting said growth product with a low molecular weight alkylene to produce a displacement product containing low molecular weight aluminum trialkyl and straight-chain alpha-olefins corresponding in carbon chain length with the alkyls of said growth product,
   (c) separating the low molecular weight aluminum trialkyl from said displacement product,
   (d) separating from the remainder of said displacement product a fraction comprising linear alpha-olefins of at least 20 carbon atoms, and
   (e) returning at least a portion of said fraction of step (d) Step (d) to Step (a) as said diluent.
2. The process of claim 1 wherein said fraction of Step (d) comprises olefins of at least 22 carbon atoms.
3. The process of claim 1 wherein said reacting of Step (b) comprises a thermal displacement.
4. The process of claim 1 wherein said low molecular weight aluminum trialkyl is aluminum triethyl.
5. A process which comprises
   (a) reacting a low molecular weight aluminum trialkyl with ethylene in the presence of a hydrocarbon diluent hereinafter defined to produce a growth product,
   (b) reacting said growth product with a low molecular weight alkylene to produce a displacement product containing low molecular weight aluminum trialkyl and straight-chain alpha-olefins corresponding in carbon chain length with the alkyls of said growth product,
   (c) separating the low molecular weight aluminum trialkyl from said displacement product,
   (d) separating from the remainder of said displacement product a fraction comprising linear alpha-olefins of at least 20 carbon atoms,
   (e) isomerizing at least a portion of said fraction of Step (d), and
   (f) returning at least a portion of the isomerized material of Step (e) to Step (a) as said diluent.
6. The process of claim 5 wherein said fraction of Step (d) comprises olefins of at least 22 carbon atoms.
7. The process of claim 5 wherein said reacting of Step (b) comprises a thermal displacement.
8. The process of claim 5 wherein said low molecular weight aluminum trialkyl is aluminum triethyl.
9. A process which comprises
   (a) reacting a low molecular weight aluminum trialkyl with ethylene in the presence of a hydrocarbon diluent hereinafter defined to produce a growth product,
   (b) reacting said growth product with a low molecular weight alkylene to produce a displacement product containing low molecular weight aluminum trialkyl and straight-chain alpha-olefins corresponding in carbon chain length with the alkyls of said growth product, (c) separating the low molecular weight aluminum trialkyl from said displacement product, (d) separating from the remainder of said displacement product a fraction comprising linear alpha-olefins of at least 20 carbon atoms, (e) hydrogenating at least a portion of said fraction of Step (d), and (f) returning at least a portion of the hydrogenated material of Step (e) to Step (a) as said diluent.

10. The process of claim 9 wherein said fraction of Step (d) comprises olefins of at least 22 carbon atoms.

11. The process of claim 9 wherein said reacting of Step (b) comprises a thermal displacement.

12. The process of claim 9 wherein said low molecular weight aluminum trialkyl is aluminum triethyl.

13. A process which comprises (a) reacting a low molecular weight aluminum trialkyl with ethylene in the presence of a hydrocarbon diluent hereinafter defined to produce a growth product, (b) reacting said growth product with a low molecular weight alkylene to produce a displacement product containing low molecular weight aluminum trialkyl and straight-chain alpha-olefins corresponding in carbon chain length with the alkyls of said growth product, (c) separating from said displacement product a fraction comprising olefins of at least 20 carbon atoms, (d) subjecting at least a portion of the separated olefins of Step (c) to an isomerization treatment whereby the double bond of the olefins is shifted from the alpha position to an internal position, and (e) returning at least a portion of the isomerized product of Step (d) as said diluent of Step (a).

14. The process of claim 13 wherein the alkyl substiutents of said growth product range in carbon chain content from 2 to about 40 carbon atoms, said low molecular weight aluminum trialkyl is aluminum triethyl, and said fraction comprising olefins of Step (c) comprises olefins of at least 22 carbon atoms.

References Cited

UNITED STATES PATENTS 2,863,896   12/1958   Johnson _____ 260—683.15
2,906,794   9/1959   Aldridge et al. ____ 260—683.15

PAUL M. COUGHLAN, Jr., *Primary Examiner.*